May 11, 1965  H. S. BELL, JR  3,182,447
REACTION MOTOR
Filed Feb. 27, 1957  3 Sheets-Sheet 1
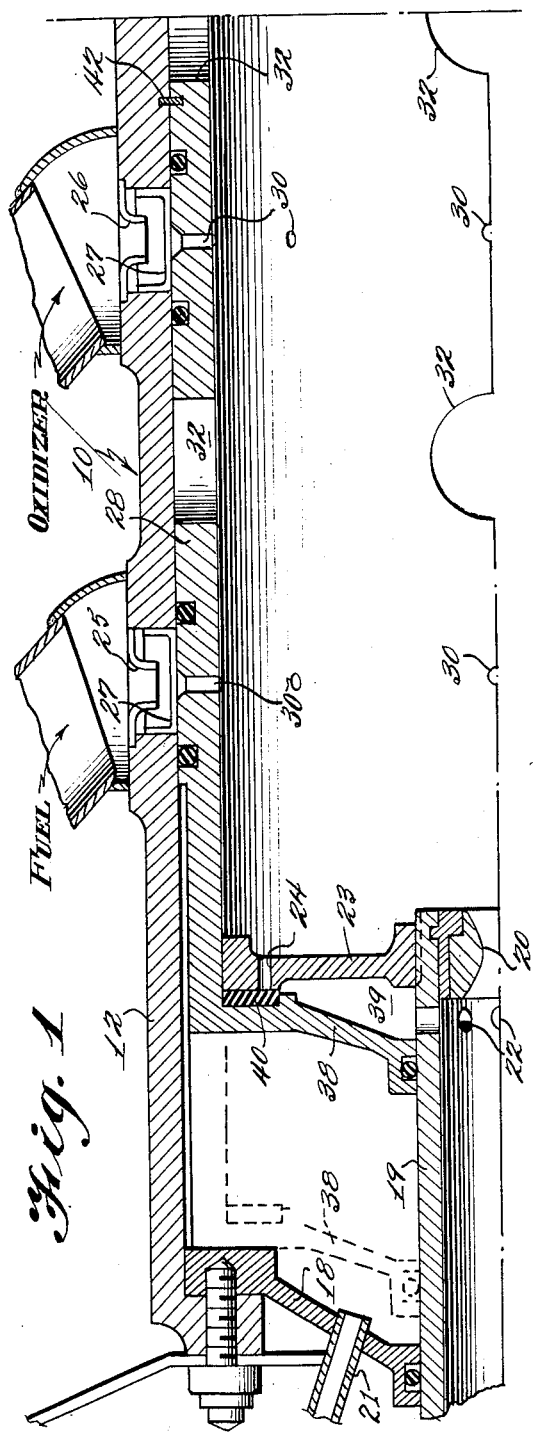
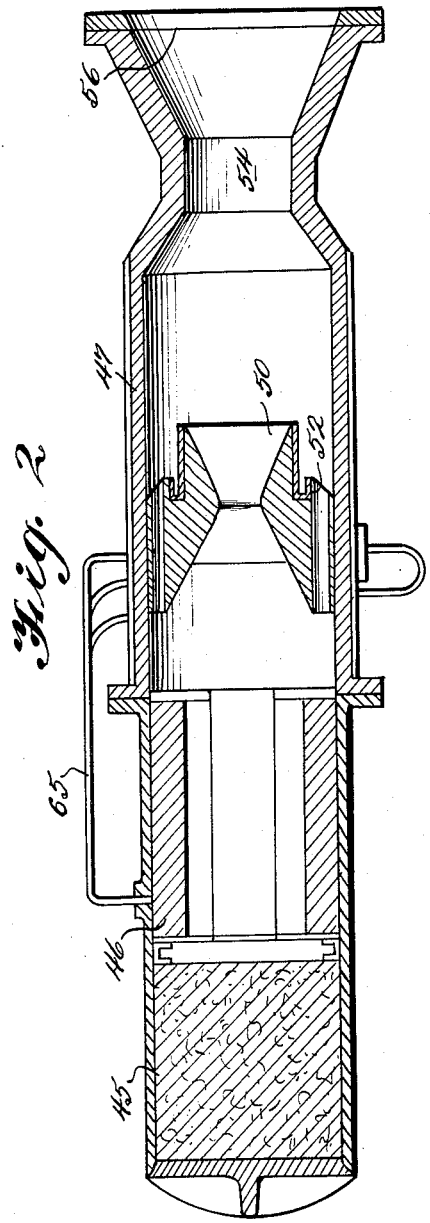
INVENTOR
HAROLD S. BELL JR.
BY William R. Wright, Jr.
his AGENT May 11, 1965 H. S. BELL, JR 3,182,447
REACTION MOTOR
Filed Feb. 27, 1957 3 Sheets-Sheet 2
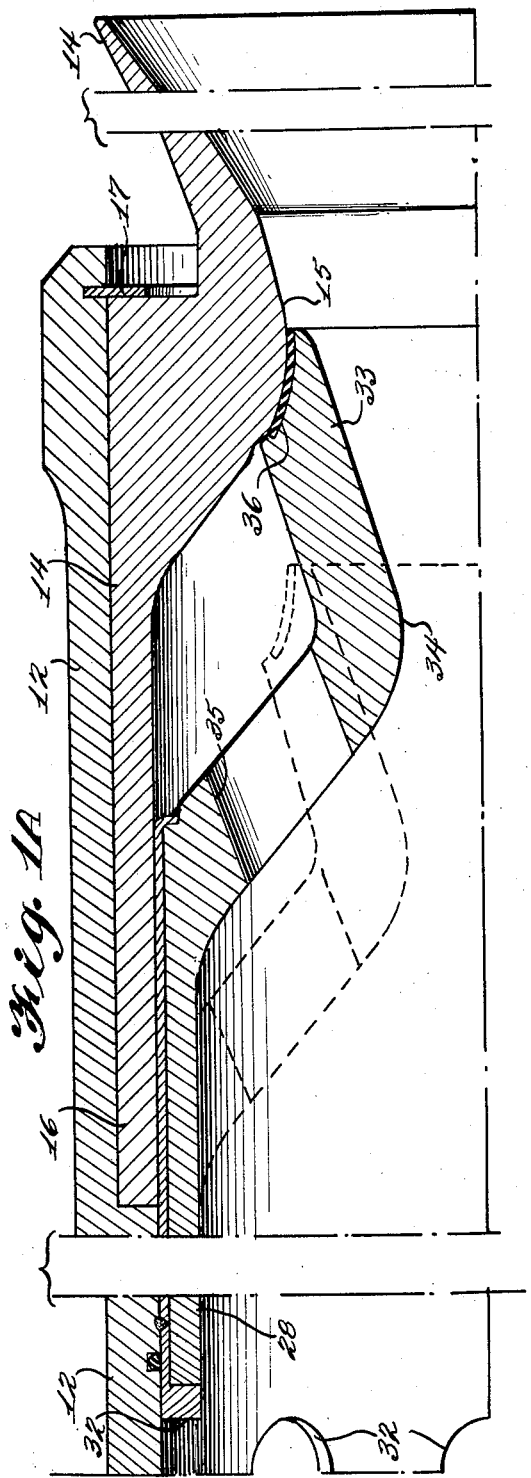
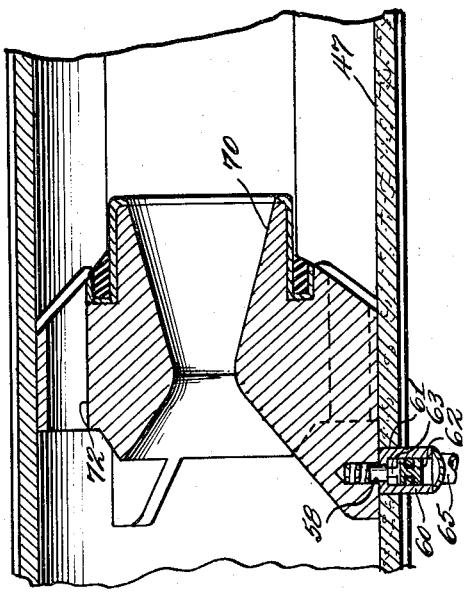
INVENTOR
HAROLD S. BELL JR.
BY William R. Wright Jr.
his AGENT

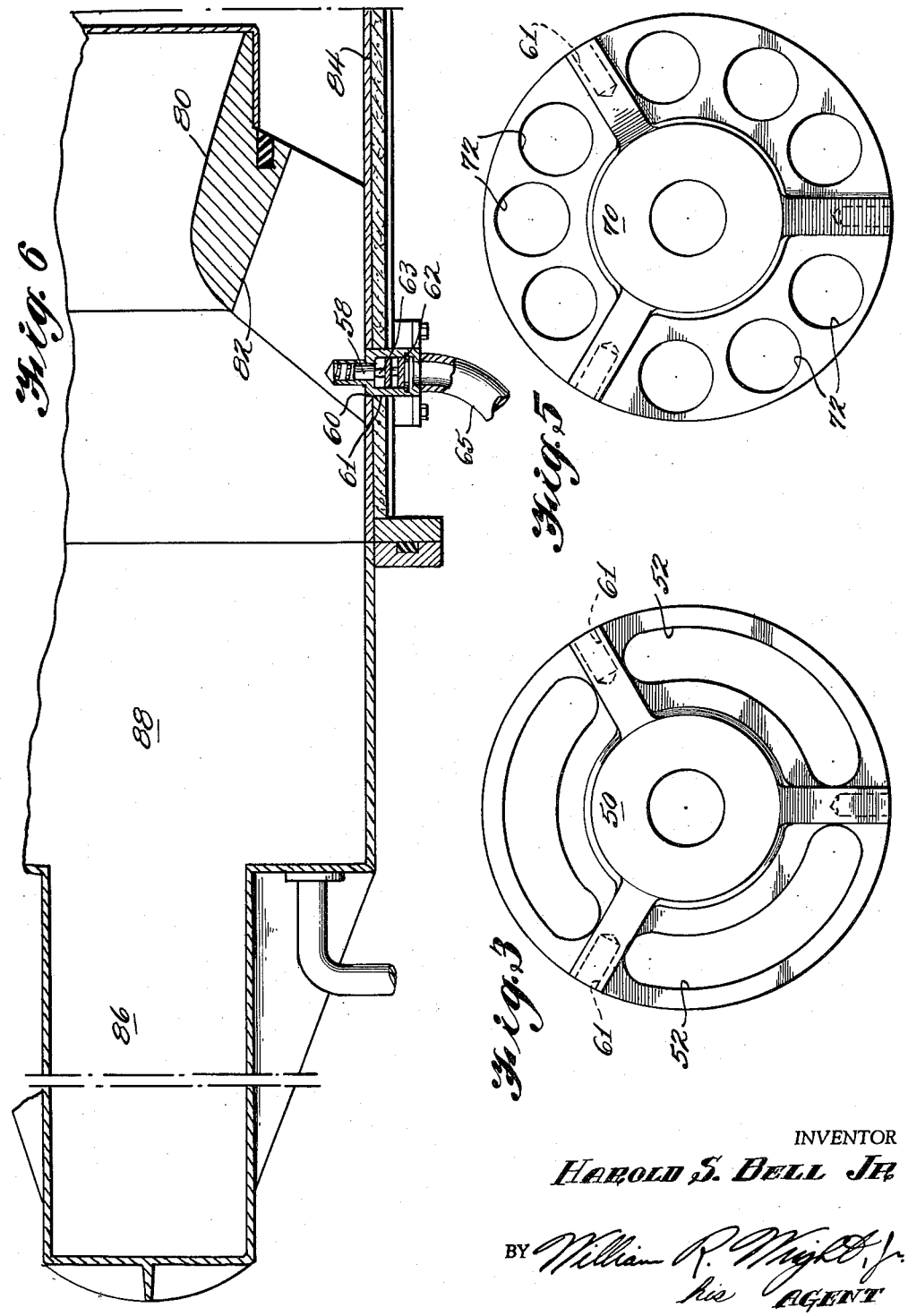

United States Patent Office 3,182,447
Patented May 11, 1965

3,182,447
REACTION MOTOR
Harold S. Bell, Jr., Whippany, N.J., assignor, by mesne assignments, to Thiokol Chemical Corporation, a corporation of Delaware
Filed Feb. 27, 1957, Ser. No. 642,910
18 Claims. (Cl. 60—35.6)

This invention relates generally to powerplants for missiles and more particularly to an improved rocket powerplant operable at two levels of thrust.

Rocket powerplants of this general type are known in the art, but are usually characterized by a number of inherently disadvantageous features. Among these are a seriously low performance during sustainer phase operation experienced when propellant flow to a combustion chamber having a fixed throat area is throttled; an inability to vary the propellant flow to the combustion chamber while simultaneously varying the exhaust nozzle throat area; a difficulty in seating the sustainer nozzle in the booster nozzle where a freely moving slide nozzle is used; an inaccurate timing between propellant throttling and nozzle throttling in systems employing these flow control elements independently; and an inability to provide a thrust chamber construction capable of constant chamber pressure operation at two widely different levels of thrust.

Accordingly, the chief object of the present invention is to provide an improved rocket powerplant for missiles which will obviate the above and other disadvantages characterising known structures.

An important object of the present invention is to provide an improved rocket powerplant for missiles which is capable of operating initially at a high booster phase and subsequently at a low sustainer phase while maintaining a constant combustion chamber pressure to effect high performance during both phases of operation.

Another important object of the present invention is to provide an improved rocket powerplant of the type described wherein a single member simultaneously controls propellant and nozzle throttling to thus ensure accurate timing thereof.

A further important object of the present invention is to provide an improved rocket powerplant of the type described wherein the fuel and oxidizer supplied under pressure to the combustion chamber are turbulently mixed by a plurality of jets during the booster phase of operation and by a single jet during the sustainer phase.

Other objects and advantages of the present invention will become apparent during the course of the following description.

In the drawings, I have shown several embodiments of the invention. In these showings:

FIGURES 1 and 1A are a central, longitudinal, sectional view of the rocket powerplant comprising the present invention;

FIGURE 2 is a similar view to a reduced scale of another form of the invention;

FIGURE 3 is a front elevational view of the nozzle used therein;

FIGURE 4 is a longitudinal sectional view to an enlarged scale of another form of the sustainer nozzle;

FIGURE 5 is a front elevational view thereof; and

FIGURE 6 is a fragmentary central, longitudinal, sectional view of a further form of the rocket powerplant.

Referring to the drawings, numeral 10 designates the rocket powerplant as a whole which comprises a tubular combustion chamber 12 enlarged at its aft end to receive a booster nozzle 14 having a throat portion 15 and a forward portion 16 of the same internal diameter as the chamber 12, the nozzle 14 being retained in position by means of a snap ring 17.

The forward end of the chamber 12 includes an annular header 18 (having a pressure inlet tube 21) in which large tube 19 having a jet mixing nozzle 20 is centrally positioned. The aft end of the tube 19 is provided with a plurality of circumferentially spaced orifices 22 formed therein just in advance of a fixed inner annular header 23 having a plurality of annularly spaced orifices 24 formed therein.

A plurality of circumferentially spaced fuel and oxidizer injection orifices 25 and 26 are respectively formed in the wall of the combustion chamber 12 and these are hermetically sealed against loss of the propellants by means of burst discs 27. The burst discs are supported against possible failure due to hydraulic loads resulting from rough handling of the powerplant by a tubular injector-nozzle slide 28 mounted in the chamber 12.

As is seen in FIGURE 1, a plurality of small sustainer injection orifices 30 and a plurality of large booster injection orifices 32 are formed in the wall of the slide 28 at circumferentially spaced points with the orifices 30 in alignment with the fuel and oxidizer injection orifices 25 and 26 in the storage position shown in full lines. Since the sustainer injection orifices 30 are small, they do not materially reduce the support of the burst discs even though they are oriented directly behind each one.

The aft end of the injector-nozzle slide 28 (FIGURE 1A) terminates in a sustainer nozzle 33 having a throat 34 and annularly spaced, outwardly inclined slots 35. The aft end of the nozzle 33 is shaped to seat tightly against the forward portion of the throat 15 of the booster nozzle 14, and includes a sealing gasket 36. The forward end of the slide 28 extends beyond the inner header 23 and terminates in an inwardly inclined, annular wall 38 which engages the sides of the tube 19 and forms an expansible chamber 39 with the header 23 and includes a gasket 40 which seals the mixing orifices 24 as shown. The various sliding surfaces are sealed against leakage by means of O-rings.

Operation

The injector nozzle slide 28 is held in the position shown during storage and handling by means of a plurality of circumferentially spaced shear pins 42. When the rocket powerplant 10 is to be fired, hot gases from a separate source are admitted to the tube 19 and a portion thereof enter the expansible chamber 39 by way of the orifices 22. The pressure of the gases moves the injector-nozzle slide to the left to the dotted line positions shown (FIGURES 1 and 1A) shearing off the pins 42 and moving the sustainer nozzle 33 away from the throat 15 of the booster nozzle 14.

The booster injection orifices 32 are now aligned with the fuel and oxidizer injection orifices 25 and 26 respectively and the pressurized propellants drive the burst discs 27 through the orifices 32 thus initiating boost phase propellant flow. The pressure to the left of the slide wall 38 is ambient during this phase. The hot gases in the tube 19 pass into the combustion chamber 12 through the central jet mixing nozzle 20 and the outer orifices 24 which have been uncovered, and ignite the propellants and promote turbulence. The resulting combustion gases pass through the sustainer nozzle slots 35 as well as through its throat 34 and out the nozzle 14.

When the booster phase of operation has been concluded, a high pressure gas source is admitted through the tube 21 and acts against the slide wall 38 to move the injector-nozzle slide 28 back to the full line position sealing off the outer mixing orifices 24 and firmly seating the sustainer nozzle 33 against the throat 15 of the booster nozzle 14 to seal off the sustainer nozzle slots 35.

The sustainer injection orifices 30 are simultaneously indexed under the fuel and oxidizer injection orifices 25 and 26 so that the liquid propellant flow and the combustion gas exhaust flow are simultaneously throttled to sustainer values while maintaining a constant combustion chamber pressure. The jet mixing flow is now through the nozzle 20 only.

Another embodiment of the invention is disclosed in FIGURES 2 and 3 wherein the rocket powerplant includes a solid propellant 45 for sustainer phase operation and a star shaped solid propellant 46 for booster phase operation housed forwardly of the combustion chamber 47. A sustainer nozzle 50 is slidably mounted in the chamber and includes a plurality of axially extending, annularly spaced slots 52 through which combustion gases pass during the booster phase.

The outer, aft periphery of the sustainer nozzle 50 is adapted to conform with and be received in and seat against the tubular throat 54 of the booster nozzle 56 upon completion of the booster phase of operation. The nozzle 50 is retained in the position shown by means of a plurality of annularly spaced detents 53 mounted in the forward part of the nozzle 50 between the slots 52 and spring pressed into holding engagement with the combustion chamber wall as shown in detail in FIGURES 3 to 6.

A small cylinder 60 is mounted in an aperture 61 in the wall opposite each of the detents 58 and slidably mounted therein is a piston 62 having a reduced head 63 in engagement with the detent 58. Gas pressure is furnished to the outer sides of the pistons 62 from the burning solid booster phase propellant by means of conduits 65 projecting into the forward part of the propellant chamber.

In the operation of the forms of the invention disclosed in FIGURES 2 and 3 and in FIGURES 4 and 5 wherein the nozzle 70 differs primarily in that it is provided with circular axially extending gas slots or passages 72, the booster phase solid propellant 46 is first ignited. The gases forming the products of combustion pass through the sustainer nozzle 50 and the passages 52, or through the sustainer nozzle 70 and passages 72, and then out through the booster nozzle 56. As the solid booster propellant 46 is consumed, the forward ends of the conduits 65 are uncovered admitting pressurizing gas to the pistons 62. The detents 58 are forced radially inward by the piston heads 63 to release the sustainer nozzle 50 or 70 which slides to the right under pressure of the gases in the combustion chamber 47.

As the sustainer nozzle 50 or 70 seats in the throat 54 of the nozzle 56 sealing off the nozzle slots 52 or 72, the flow of exhaust gases is thus throttled. Simultaneously with the seating of the sustainer nozzle in the booster nozzle 56, the slower burning solid propellant 45 commences to furnish combustion gases at a lower or throttle rate, the solid propellant 46 having been consumed. Thus, a simultaneous throttling of gas generation and exhaust gas flow is also effected in this embodiment while maintaining a substantially constant combustion chamber pressure.

In FIGURE 6, a further embodiment of the invention is disclosed wherein a sustainer nozzle 80 having exhaust gas slots 82 is slidably mounted in a combustion chamber 84 and retained in the booster phase position shown by the above described detents 58.

The same solid propellant is used for both the booster phase and the sustainer phase of operation with the throttling from a large amount of generated gas for the former to a smaller amount for the latter phase being effected by controlling the burning area of the solid propellant.

Thus, as shown in the drawing, the booster phase propellant is contained in an enlarged portion 88 of the propellant chamber and when this is substantially consumed to effect release of the detents 58 holding the nozzle 80 by pressure through the conduits 65, ignition of the propellant in the smaller diameter portion 86 of the propellant chamber occurs and gas generation continues at a throttled rate.

It will thus be seen that the various forms of the invention ensure a more accurate timing between propellant throttling and nozzle throttling than is obtained where these flow control elements are employed independently and a materially improved seating of the sustainer nozzle in the booster nozzle is obtained due to the gas pressure forcing the sustainer nozzle against the booster nozzle.

It will be understood that the use of the terms booster refers to the use of the larger booster nozzle and the larger booster propellant inlet orifices as well as to the propellent of greater cross-sectional area for greater gas generation whereas the term sustainer refers to the use of the smaller booster nozzle with the slots blocked by the booster nozzle and the smaller sustainer propellant inlet orifices as well as to the propellant of smaller cross-sectional area for throttled gas generation. In other words, the booster phase is the high level thrust phase and the sustainer phase is the low level thrust phase.

It is to be understood that the forms of my invention herewith shown and described are to be taken as preferred examples of the same and that various changes in the shape, size and arrangement of parts may be resorted to without departure from the spirit of the invention or the scope of the subjoined claims.

I claim:

1. A rocket powerplant comprising a combustion chamber terminating in a first expansion nozzle, a smaller expansion nozzle concentric therewith and having axially arranged slots concentrically formed therein and extending therethrough slidably mounted in and along the walls of said chamber and adapted to slide from a forward position and seat in and against said first nozzle and close said slots, means for generating gases in said chamber and exhausting them through said smaller nozzle and said slots in a forward position and through said first nozzle, and means connected to said smaller nozzle and responsive to gas pressure for effecting movement of said smaller nozzle to seat in said first nozzle and close said slots to throttle the exhaust gases passing through said first nozzle.

2. A device as recited in claim 1 wherein the volume of the gases generated in said chamber is throttled simultaneously with the throttling of said first nozzle.

3. A rocket powerplant having booster and sustainer phase operation comprising a combustion chamber terminating in a booster expansion nozzle, a sustainer expansion nozzle concentric therewith including gas bypassing slots formed concentrically therein mounted in said chamber and slidable from a forward booster position in and along the walls of said chamber to a sustainer position seated against said booster nozzle blocking said slots, means for generating booster phase gases in said chamber to pass through said sustainer nozzle and slots and through said booster nozzle, and means operable upon substantial completion of booster phase operation to effect a throttling of gas generation to sustainer phase and simultaneously effect movement of said sustainer nozzle to sustainer position against said booster nozzle to throttle the gases passing therethrough.

4. A device as recited in claim 3 wherein said slots extend axially of said sustainer nozzle and are arranged concentric therewith.

5. A device as recited in claim 4 wherein said slots are arcuate in cross-section.

6. A device as recited in claim 4 wherein said slots are circular in cross-section.

7. A device as recited in claim 3 wherein said throttling means comprises a slide movable with said sustainer nozzle and containing orifices controlling the volume of rocket propellant admitted to said combustion chamber.

8. A device as recited in claim 3 wherein said throttling means comprises a sustainer propellant, a booster propellent in communication therewith, gas pressure releasing means holding said sustainer nozzle in forward position and conduits connecting said releasing means with said booster propellent adjacent said sustainer propellant whereby the near exhausting of said booster propellent ignites said sustainer propellant and admits gases to said releasing means to permit movement of said sustainer nozzle to sustainer position.

9. A device as recited in claim 8 wherein said booster propellant has higher hot gas producing characteristics than said sustainer propellant.

10. A device as recited in claim 8 wherein said booster propellant has a materially greater cross-sectional area than said sustainer propellant.

11. A rocket powerplant for booster and sustainer phase operation comprising a combustion chamber terminating in a booster nozzle, a header closing the forward end of said chamber and including a central, gas admitting tube including a central nozzle extending therewithin, an annular wall fixed to the inner end of said tube and forming a pressure chamber with said header, a slide mounted within said combustion chamber terminating in a sustainer nozzle having axially arranged gas bypassing slots at its aft end and a wall at its forward end in said pressure chamber and spaced from said annular wall, propellent inlet orifices formed in the combustion chamber, spaced sustainer and booster inlet orifices formed in said slide and adapted to be alternately aligned with said propellant orifices, and orifices formed in said tube to admit gases between said annular wall and said slide wall to move said slide to booster position.

12. A device as recited in claim 11 wherein said propellent inlet orifices include seals supported by said slide prior to movement thereof to booster position.

13. A device as recited in claim 1 wherein gas admitting means connects with said pressure chamber to act on said slide wall and move said slide to sustainer position against said booster nozzle closing said slots and aligning said sustainer inlet orifices with said propellent inlet orifices to simultaneously throttle said booster nozzle and the propellant flow.

14. A device as recited in claim 11 wherein orifices are annularly spaced in said annular wall adjacent the wall of said combustion chamber to effect propellant mixing jets concentric with the mixing jet issuing from said central nozzle upon the admission of gases to said tube.

15. A rocket powerplant for booster and sustainer phase operation comprising a combustion chamber terminating in a booster nozzle, a propellant chamber including a sustainer propellant and a booster propellant aft thereof and in communication therewith, a sustainer nozzle including gas bypassing slots slidably mounted in said combustion chamber, means holding said sustainer nozzle in a forward position in said chamber during booster phase operation, and means operable just prior to sustainer phase operation to release said sustainer nozzle for movement to sustainer position against said booster nozzle to block said slots as said booster propellant ignites said sustainer propellent.

16. A device as recited in claim 15 wherein said holding means is releasable by fluid pressure, and conduits connect said holding means with said booster propellant adjacent said sustainer propellant whereby consumption of said booster propellant uncovers said conduit means.

17. A device as recited in claim 15 wherein said booster propellant has higher hot gas producing characteristics than said sustainer propellant.

18. A device as recited in claim 15 wherein said booster propellant has a materially greater cross-sectional area than said sustainer propellant.

References Cited by the Examiner
UNITED STATES PATENTS

| 2,408,099 | 9/46 | Sherman | 60—35.6 |
| 2,563,745 | 8/51 | Price | 60—35.6 |
| 2,653,446 | 9/53 | Price | 60—35.6 |
| 2,780,914 | 2/57 | Ring | 60—35.6 |

FOREIGN PATENTS 659,758  10/51  Great Britain.

SAMUEL LEVINE, *Primary Examiner.*

SAMUEL FEINBERG, SAMUEL BOYD, ARTHUR M. HORTON, *Examiners.*